United States Patent
Lee

(10) Patent No.: US 9,916,926 B2
(45) Date of Patent: Mar. 13, 2018

(54) MULTILAYER ELECTRONIC COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventor: Seung Kye Lee, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/990,326

(22) Filed: Jan. 7, 2016

(65) Prior Publication Data

US 2016/0293328 A1 Oct. 6, 2016

(30) Foreign Application Priority Data

Apr. 1, 2015 (KR) ........................ 10-2015-0046307

(51) Int. Cl.
*H01F 5/00* (2006.01)
*H01F 27/28* (2006.01)
(Continued)

(52) U.S. Cl.
CPC ....... *H01F 41/043* (2013.01); *H01F 17/0013* (2013.01); *H01G 4/012* (2013.01); *H01G 4/30* (2013.01)

(58) Field of Classification Search
CPC .................... H01F 27/2804; H01F 2027/2809
(Continued)

(56) References Cited

U.S. PATENT DOCUMENTS 6,107,907 A * 8/2000 Leigh .................. H01F 17/0006
336/200
6,278,602 B1 8/2001 Haratani et al.
(Continued)

FOREIGN PATENT DOCUMENTS

JP 3259686 B2 2/2002
JP 2005-044897 A 2/2005
(Continued)

OTHER PUBLICATIONS

Korean Office Action dated Feb. 4, 2016 issued in the corresponding Korean patent application No. 10-2015-0046307. (w/ English abstract).

*Primary Examiner* — Elvin G Enad
*Assistant Examiner* — Kazi Hossain
(74) *Attorney, Agent, or Firm* — McDermott Will & Emery LLP

(57) ABSTRACT

A method of manufacturing a multilayer electronic component comprises steps of: preparing first insulating sheets having internal electrode patterns formed thereon; moving one or more of the first insulating sheets having the internal electrode patterns formed thereon onto a lower mold; arranging a second insulating sheet to be disposed between an internal electrode pattern disposed in an uppermost position among the internal electrode patterns formed on the lower mold and an upper mold and pressing the first insulating sheets having the internal electrode patterns formed thereon by the upper mold to form a laminate; and sintering the laminate to form a multilayer body. In a cross section in a width-thickness direction of the internal electrode pattern included in the multilayer body, $0.45 \leq t_2/t_2 \leq 1.0$, where $t_1$ is a thickness of one side of the internal electrode pattern in relation to a central line connecting both vertices of the internal electrode pattern in a width direction and $t_2$ is a (Continued)

thickness of the other side of the internal electrode pattern in relation to the central line and $t_2$ is larger than or equal to $t_1$.

2 Claims, 6 Drawing Sheets

(51) Int. Cl.
    *H01F 41/04*     (2006.01)
    *H01F 17/00*     (2006.01)
    *H01G 4/30*     (2006.01)
    *H01G 4/012*     (2006.01)

(58) Field of Classification Search
    USPC .................................... 336/200, 232, 223
    See application file for complete search history.

(56) References Cited

U.S. PATENT DOCUMENTS

| | | | |
|---|---|---|---|
| 6,498,553 B1* | 12/2002 | Tanaka | H01F 5/003 336/183 |
| 6,597,270 B2* | 7/2003 | Takashima | H01F 17/0013 336/200 |
| 7,307,503 B2* | 12/2007 | Kaji | H01F 17/0006 257/E21.022 |
| 2001/0024739 A1* | 9/2001 | Mizoguchi | H01F 17/0006 428/606 |
| 2005/0184848 A1* | 8/2005 | Yoshida | H01F 17/0013 336/223 |
| 2006/0220776 A1* | 10/2006 | Fujiwara | H01F 17/0006 336/200 |
| 2007/0222550 A1* | 9/2007 | Fujiwara | H01F 17/033 336/200 |
| 2009/0256668 A1* | 10/2009 | Noma | H01F 17/0013 336/200 |
| 2012/0140377 A1 | 6/2012 | Kim et al. | |
| 2013/0241684 A1* | 9/2013 | Yang | H01F 17/0013 336/200 |

FOREIGN PATENT DOCUMENTS

| | | |
|---|---|---|
| JP | 2005-136126 A | 5/2005 |
| KR | 10-2011-0128554 A | 11/2011 |
| KR | 10-1288154 B1 | 7/2013 |

\* cited by examiner

20

MULTILAYER ELECTRONIC COMPONENT AND METHOD OF MANUFACTURING THE SAME

CROSS-REFERENCE TO RELATED APPLICATION

This application claims the benefit of priority to Korean Patent Application No. 10-2015-0046307, filed on Apr. 1, 2015 with the Korean Intellectual Property Office, the entirety of which is incorporated herein by reference.

TECHNICAL FIELD

The present disclosure relates to a multilayer electronic component and a method of manufacturing the same.

BACKGROUND

A multilayer electronic component, such as a multilayer inductor, a multilayer capacitor, or the like, may be manufactured as follows. First, internal electrode patterns are formed on insulating sheets, the insulating sheets on which the internal electrode patterns are formed are stacked and pressed to form a laminate, and the laminate is cut and fired to form a multilayer body.

External electrodes for electrically connecting internal electrodes to external circuits are formed on outer surfaces of the multilayer body to manufacture the multilayer electronic component.

SUMMARY

An exemplary embodiment in the present disclosure provides a multilayer electronic component manufactured to have an internal electrode pattern having a symmetrical structure by reducing spreading of the internal electrode pattern when a laminate is formed, and a method of manufacturing the same.

According to an exemplary embodiment in the present disclosure, a method of manufacturing a multilayer electronic component in which insulating sheets having internal electrode patterns formed thereon are pressed after another insulating sheet is formed between an internal electrode pattern disposed in an uppermost position and an upper mold when a laminate is formed by stacking and pressing the insulating sheets having the internal electrode patterns formed thereon.

According to an exemplary embodiment in the present disclosure, a multilayer electronic component in which in a cross section, in a width-thickness direction, of an internal electrode pattern included in a multilayer body, when a thickness of one side of the internal electrode pattern in relation to a central line connecting both vertices of the internal electrode pattern in a width direction to each other is $t_1$ and a thickness of the other side of the internal electrode pattern in relation to the central line is $t_2$, $t_2$ is larger than or equal to $t_1$, and $0.45 \leq t_1/t_2 \leq 1.0$ is satisfied.

BRIEF DESCRIPTION OF DRAWINGS

The above and other aspects, features and other advantages of the present disclosure will be more clearly understood from the following detailed description taken in conjunction with the accompanying drawings.

DETAILED DESCRIPTION

Figure 1:
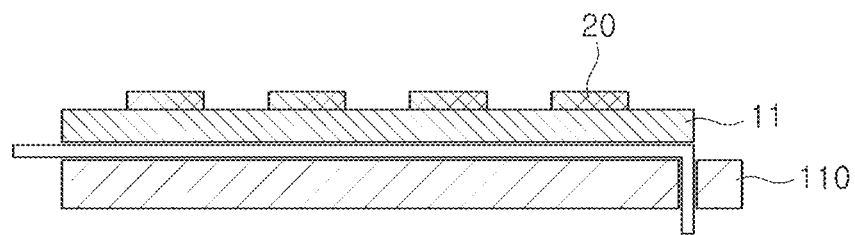
FIGS. 1 through 5 are views illustrating a process of manufacturing a multilayer electronic component according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "upper," or "above" other elements would then be oriented "lower," or "below" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Hereinafter, a method of manufacturing a multilayer electronic component according to an exemplary embodiment in the present disclosure, particularly, a method of manufacturing a multilayer inductor will be described. However, the multilayer electronic component according to an exemplary embodiment in the present disclosure is not limited to the multilayer inductor.

FIGS. 1 through 5 are views illustrating a process of manufacturing a multilayer electronic component according to an exemplary embodiment in the present disclosure. Meanwhile, the same reference numerals in the accompanying drawings will be used regardless of states before and after a pressing operation and a sintering operation.

Referring to FIG. 1, a first insulating sheet 11 may be prepared on a support 110, and an internal electrode pattern 20 may be printed on the first insulating sheet 11.

The first insulating sheet 11 may be manufactured in a sheet shape by mixing ceramic powder particles having a dielectric material, ferrite, or the like, as a main component, a binder resin, a solvent, a plasticizer, and a dispersant, and the like, with each other to prepare a slurry and applying the slurry to and drying the slurry on a carrier film by a doctor blade method, a pulling method, a die coating method, a gravure roll coating method, or the like.

A conductive paste containing a conductive metal may be applied to the first insulating sheet 11 by a printing method to form the internal electrode pattern 20.

A method of printing the conductive paste may be a screen printing method, a gravure printing method, or the like, but is not necessarily limited thereto.

The conductive metal may be any metal having excellent electrical conductivity, for example, silver (Ag), palladium (Pd), aluminum (Al), nickel (Ni), titanium (Ti), gold (Au), copper (Cu), platinum (Pt), or the like, or a mixture thereof.

A via may be formed in the first insulating sheet 11 in a predetermined position on which the internal electrode pattern 20 is printed, and internal electrode patterns 20 formed on a plurality of first insulating sheets 11 may be electrically connected to each other by the via to form a coil part.

Figure 2:
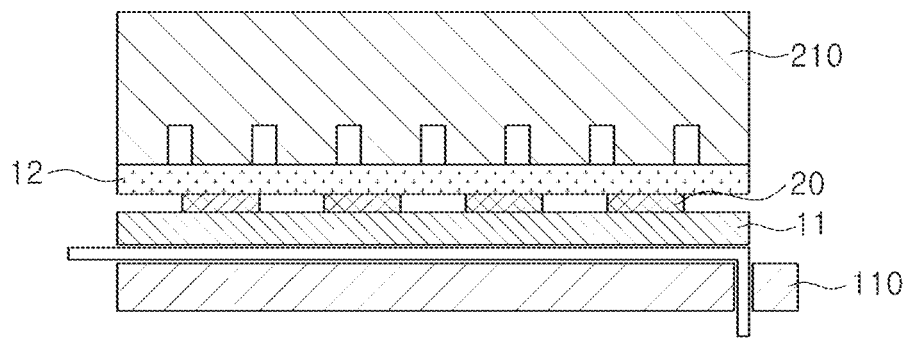

Referring to FIG. 2, the first insulating sheet 11 having the internal electrode pattern 20 formed thereon may be pressed by an upper mold 210. Here, in an exemplary embodiment in the present disclosure, after a second insulating sheet 12 is formed on a pressing surface of the upper mold 210, the first insulating sheet 11 having the internal electrode pattern 20 formed thereon may be pressed.

Therefore, the internal electrode pattern 20 is not directly pressed by the upper mold 210, but may contact the second insulating sheet 12 having fluidity. Therefore, spreading of the internal electrode pattern 20 may be reduced.

The second insulating sheet 12 may be manufactured in a sheet shape by mixing ceramic powder particles having a dielectric material, ferrite, or the like, as a main component, a binder resin, a solvent, a plasticizer, and a dispersant, and the like, with each other to prepare slurry and applying and drying the slurry onto a carrier film by a doctor blade method, a pulling method, a die coater, a gravure roll coater, or the like. However, the second insulating sheet 12 is not necessary limited thereto, but may be a ceramic sheet having fluidity larger than that of the upper mold 210 formed of a metal.

Figure 3:
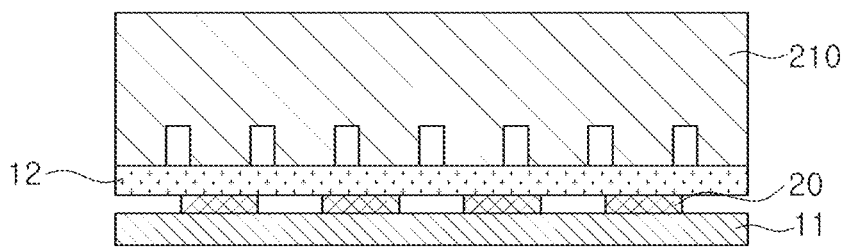
Figure 3:
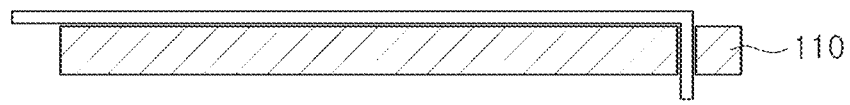

Referring to FIG. 3, the first insulating sheet 11 having the internal electrode pattern 20 formed thereon may be peeled from the support 110. Here, the first insulating sheet 11 may be peeled from the carrier film.

As described above, in an exemplary embodiment in the present disclosure, a pre-peeling post-stacking scheme of peeling the insulating sheet from the carrier film and then stacking a plurality of insulting sheets may be used.

Figure 4:
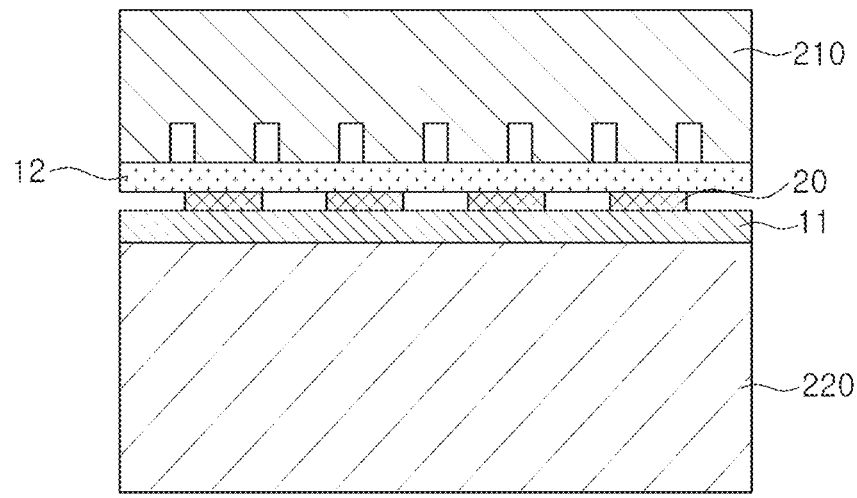

Referring to FIG. 4, the first insulating sheet 11 having the internal electrode pattern 20 formed thereon and peeled from the carrier film may be moved onto a lower mold 220.

The operations described above may be repeated to move one or more first insulating sheets 11 having the internal electrode patterns 11 formed thereon to the lower mold 220.

Here, in the pre-peeling and post-stacking scheme according to an exemplary embodiment in the present disclosure, the first insulating sheet 11 may be positioned on the lower mold 220, and the internal electrode pattern 20 may be positioned on the first insulating sheet 11 (the internal electrode pattern 20 may be positioned to face the pressing surface of the upper mold 210).

Figure 5:
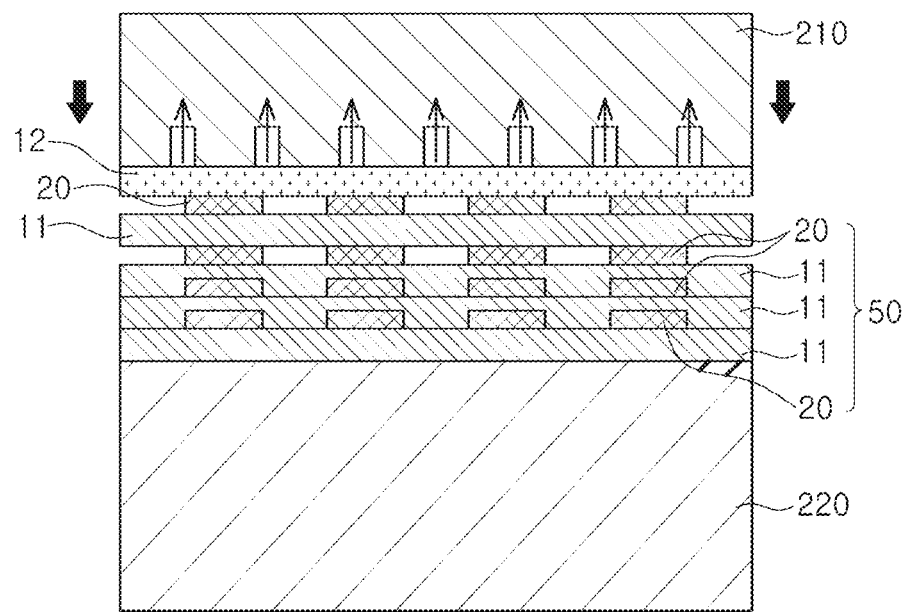

Referring to FIG. 5, a plurality of first insulating sheets 11 formed on the lower mold 220 and having the internal electrode patterns 20 formed thereon may be pressed by the upper mold 210 to form a laminate 50. Here, in an exemplary embodiment in the present disclosure, after the second insulating sheet 12 is formed between an internal electrode pattern 20 disposed in the uppermost position among the internal electrode patterns 20 formed on the lower mold 220 and the upper mold 210, the pressing may be performed on the first insulating sheets 11 having the internal electrode patterns 20 formed thereon.

For example, after the second insulating sheet 12 is attached to the pressing surface of the upper mold 210, the first insulating sheets 11 having the internal electrode patterns 20 formed thereon may be pressed by the upper mold 210 onto which the second insulating sheet 12 is attached. However, the second insulating sheet 12 is not necessarily limited to being formed by the method described above, but may be formed by any known method of forming the second insulating sheet 12 between the upper mold 210 and the uppermost internal electrode pattern 20.

Therefore, the internal electrode pattern 20 is not directly pressed by the upper mold 210, but may contact the second insulating sheet 12 having fluidity. Therefore, the spreading of the internal electrode pattern 20 may be reduced.

In the pre-peeling post-stacking scheme according to an exemplary embodiment in the present disclosure, the upper mold 210 may directly press the internal electrode patterns 20 when the laminate 50 is formed by pressing the first insulating sheets 11 having the internal electrode patterns 20 formed thereon by the upper mold 210 after the first insulating sheets 11 are peeled from the carrier films (the internal electrode patterns and the insulating sheets may be arranged in a state in which they are positioned adjacently to the upper mold to be pressed by the upper mold). In the pre-peeling post-stacking scheme in which the internal electrode patterns 20 are directly pressed by the upper mold 210 formed of the metal, problems including the spreading of the internal electrode patterns have been present.

In a post-peeling pre-stacking scheme in which the insulating sheets are stacked and then peeled from the carrier film, when the insulating sheets having the internal electrode patterns formed thereon are pressed by the upper mold 210, the upper mold 210 does not directly press the internal electrode patterns 20. The carrier film and the insulating sheet may thus be present between the upper mold 210 and the internal electrode patterns 20 (the carrier film, the insulating sheet, and the internal electrode patterns arranged such that they are positioned adjacently to the upper mold may be pressed by the upper mold). That is, in the post-peeling pre-stacking scheme, since the upper mold 210 does not directly press the internal electrode patterns 20, the spreading of the internal electrode pattern may be reduced. However, in the post-peeling pre-stacking scheme, since the carrier film is present between the upper mold 210 and the insulating sheet and the internal electrode pattern 20, it may be difficult to remove air bubbles formed in the laminate 50 by the upper mold 210 when the laminate 50 is formed by pressing the first insulating sheets having the internal electrode patterns formed thereon.

Therefore, in an exemplary embodiment in the present disclosure, the multilayer electronic component may be manufactured in the pre-peeling and post-stacking scheme of forming the laminate 50 by pressing the first insulating sheets having the internal electrode patterns formed thereon by the upper mold 210 after the first insulating sheets are peeled from the carrier films. This allows the air bubbles to be smoothly removed (the air bubbles are removed by forming groove parts of the upper mold 210 in a vacuum state) (see FIG. 5). Furthermore, the second insulating sheet 12 may be formed between the internal electrode patterns 20 disposed in the uppermost position and the upper mold 210, such that the internal electrode patterns 20 are not directly pressed by the upper mold 210, but may contact the second insulating sheet 12 having fluidity, thereby reducing the spreading of the internal electrode pattern 20.

An elongation of the second insulating sheet 12 may be 10% to 50%.

When the elongation of the second insulating sheet 12 is less than 10%, a large amount of force may be applied to the internal electrode pattern 20, such that the spreading of the internal electrode pattern 20 may be increased and a symmetry rate may be reduced. When the elongation of the second insulating sheet 12 exceeds 50%, however, the fluidity of the second insulating sheet 12 may be excessively large, which may cause deformation of the internal electrode pattern 20 in a horizontal direction.

As described above, a level of the spreading of the internal electrode pattern 20 may be changed depending on the elongation of the second insulating sheet 12, and the elongation of the second insulating sheet 12 may be 10% to 50%.

Next, the laminate 50 may be fired to form a multilayer body.

The laminate 50 may be fired at a temperature of 600° C. to 1200° C. The multilayer bodies of individual electronic components may be formed by sintering and then cutting the laminate 50 or be formed by cutting and then sintering the laminate 50.

Next, external electrodes for electrically connecting the internal electrode patterns to external circuits may be formed on outer surfaces of the multilayer body to manufacture the multilayer electronic component.

Figure 6:
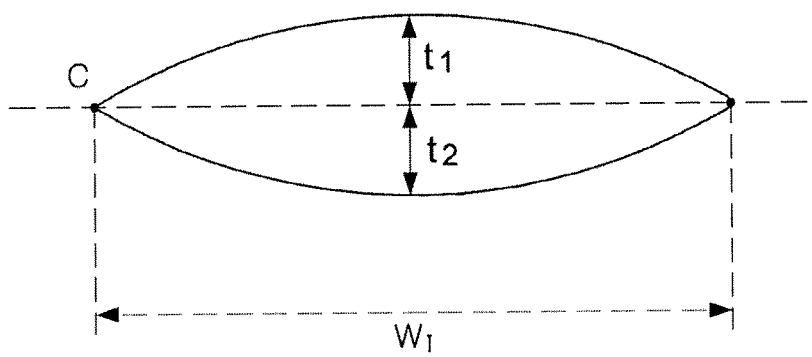
FIG. 6 is an enlarged view of a cross section, in a width-thickness direction, of an internal electrode pattern of the multilayer electronic component manufactured according to an exemplary embodiment in the present disclosure.

FIG. 6 is an enlarged view of a cross section, in a width-thickness direction, of an internal electrode pattern of the multilayer electronic component manufactured according to an exemplary embodiment in the present disclosure.

Referring to FIG. 6, in a cross section of the internal electrode pattern 20 in the width-thickness direction, a thickness of one side of the internal electrode pattern 20 in relation to a central line c connecting both vertices of the internal electrode pattern 20 in a width direction to each other is $t_1$ and a thickness of the other side of the internal electrode pattern 20 in relation to the central line is $t_2$. In the internal electrode pattern 20 included in the multilayer body of the multilayer electronic component manufactured according to an exemplary embodiment in the present disclosure, $t_2$ may be larger than or equal to $t_1$, and $0.45 \leq t_1/t_2 \leq 1.0$ may be satisfied.

Since $t_2$ is larger than or equal to $t_1$ (a thickness of a thicker side in relation to the central line c is $t_2$), $t_1/t_2$ may not exceed 1.0, and as $t_1/t_2$ approaches 1.0, the spreading of the internal electrode pattern may be reduced and the internal electrode pattern may have a symmetrical structure. Meanwhile, in the cross section of the internal electrode pattern 20 in the width-thickness direction, when $t_1/t_2$ is less than 0.45, the spreading of the internal electrode pattern may be increased and the internal electrode pattern may have an asymmetrical structure, such that a direct current (DC) resistance may be increased and reliability may be reduced.

Meanwhile, in the multilayer electronic component manufactured according to an exemplary embodiment in the present disclosure, a rate of increase of a line width WI of the internal electrode pattern 20 after being pressed as compared to a line width of the internal electrode pattern 20 in a printed state before being pressed may be 16% or less.

When the rate of increase of the line width WI exceeds 16%, the spreading of the internal electrode pattern may be increased and the internal electrode pattern may have an asymmetrical structure, such that DC resistance may be increased and reliability may be reduced.

Figure 7:
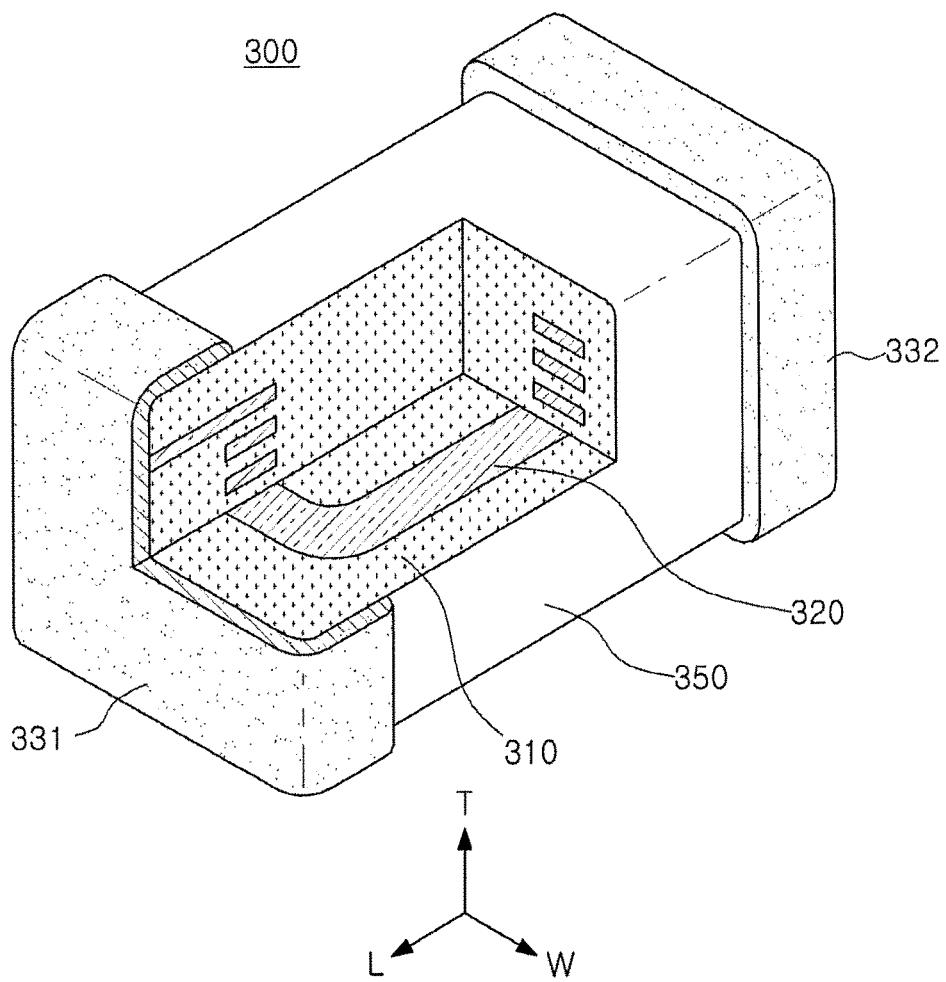
FIG. 7 is a partially cut-away perspective view of a multilayer electronic component according to an exemplary embodiment in the present disclosure.

FIG. 7 is a partially cut-away perspective view of a multilayer electronic component according to an exemplary embodiment in the present disclosure.

Referring to FIG. 7, a multilayer electronic component 300 according to an exemplary embodiment in the present disclosure may include a multilayer body 350 including a plurality of insulating layers 310, a coil part formed by connecting a plurality of internal electrode patterns 320 formed on the plurality of insulating layers 310 to each other, and first and second external electrodes 331 and 332 disposed on outer surfaces of the multilayer body 350 and connected to the coil part.

The multilayer body 350 may be formed by stacking, pressing, and sintering the plurality of insulating layers, and the plurality of insulating layers 310 forming the multilayer body 350 may be in a sintered state. In addition, adjacent insulating layers 310 may be integrated with each other so that boundaries therebetween are not readily apparent without using a scanning electron microscope (SEM).

Shapes and dimensions of the multilayer body 350 are not limited to the shapes and dimensions illustrated in the present exemplary embodiment, and a thickness of the insulating layer 310 may be arbitrarily changed in accordance with a capacity design of the multilayer electronic component 300.

The insulating layer 310 of the multilayer electronic component 300 according to an exemplary embodiment in the present disclosure may include one or more selected from the group consisting of an $Al_2O_3$-based dielectric material, Mn—Zn-based ferrite, Ni—Zn-based ferrite, Ni—Zn—Cu-based ferrite, Mn—Mg-based ferrite, Ba-based ferrite, and Li-based ferrite.

The coil part may be formed in the multilayer body 350, and may be formed by electrically connecting the internal electrode patterns 320 formed at a predetermined thickness on the plurality of insulating layers 310 forming the multilayer body 350 to each other.

The internal electrode patterns 320 may be formed by applying conductive paste containing a conductive metal onto insulating sheets by a printing method, or the like.

A via penetrating through the insulating sheets may be formed at a predetermined position on the respective insulating layers 310 on which the internal electrode patterns 320 are printed, and the internal electrode patterns 320 formed on the respective insulating layers 310 may be electrically connected to each other through the via to form one coil part.

The conductive metal forming the internal electrode patterns 320 is not particularly limited as long as it has excellent electrical conductivity. For example, the conductive metal may be at least one selected from the group consisting of silver (Ag), palladium (Pd), aluminum (Al), nickel (Ni), titanium (Ti), gold (Au), copper (Cu), platinum (Pt), or the like, or a mixture thereof.

In a cross section of the internal electrode pattern 320 in the width-thickness direction according to an exemplary embodiment in the present disclosure, when a thickness of one side of the internal electrode pattern 320 in relation to a central line c connecting both vertices of the internal electrode pattern 320 in the width direction to each other is $t_1$ and a thickness of the other side of the internal electrode pattern 320 in relation to the central line is $t_2$, in the internal electrode pattern 320 included in the multilayer body 350 of the multilayer electronic component manufactured according to an exemplary embodiment in the present disclosure, $t_2$ may be larger than or equal to $t_1$, and $0.45 \leq t_1/t_2 \leq 1.0$ may be satisfied.

Internal electrode patterns 320 disposed in the uppermost position and the lowermost position among the plurality of internal electrode patterns 320 forming the coil part may form lead portions exposed to one surface of the multilayer body 350.

The lead portions may be exposed to one surface of the multilayer body 350 to thereby be connected to the first and second external electrodes 331 and 332 disposed on the outer surface of the multilayer body 350.

Figure 8:
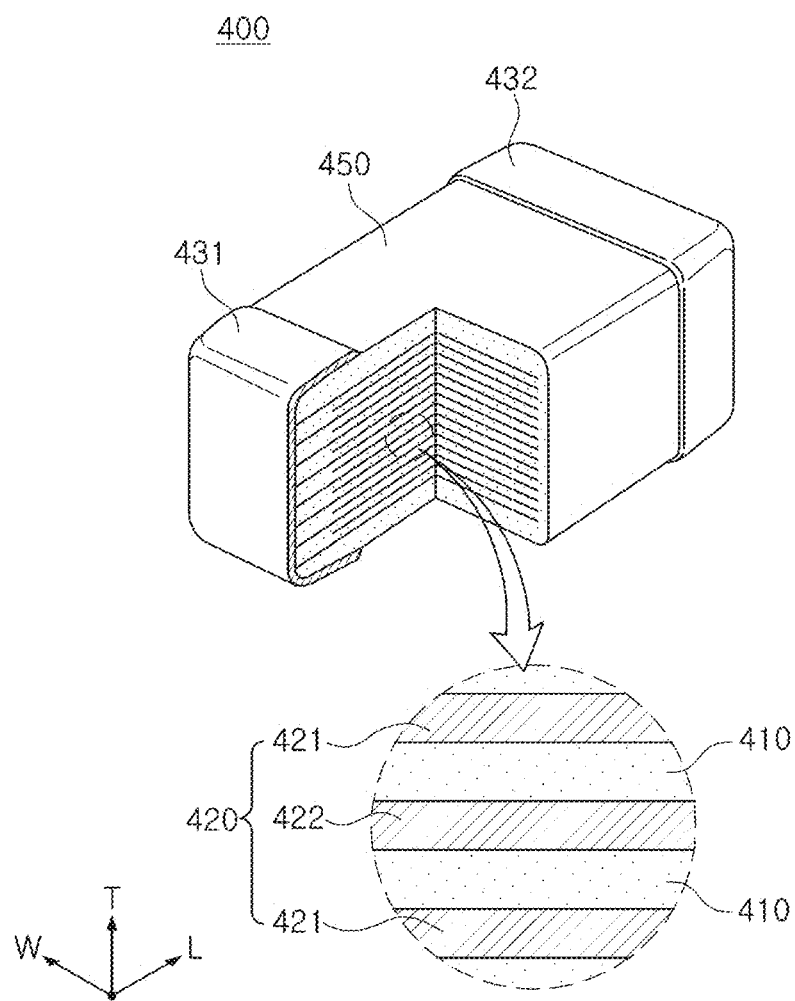
FIG. 8 is a partially cut-away perspective view of a multilayer electronic component according to another exemplary embodiment in the present disclosure.

FIG. 8 is a partially cut-away perspective view of a multilayer electronic component according to another exemplary embodiment in the present disclosure.

Referring to FIG. 8, a multilayer electronic component 400 according to another exemplary embodiment in the present disclosure may include a multilayer body 450 in which a plurality of insulating layers 410 and internal electrode patterns 420 are alternately stacked and first and second external electrodes 431 and 432 formed on outer surfaces of the multilayer body 450 and electrically connected to the internal electrode patterns 420.

The multilayer body 450 may include the insulating layers 410 and first and second internal electrode patterns 421 and 422 disposed to face each other with each of the insulating layers 410 interposed therebetween.

The insulating layer 410 may contain a dielectric material having a high k, for example, a barium titanate ($BaTiO_3$) based dielectric material or a strontium titanate ($SrTiO_3$) based dielectric material, but is not particularly limited thereto. That is, the insulating layer 140 may contain any material that may obtain a sufficient degree of capacitance.

The insulating layer 410 may further contain various ceramic additives, plasticizers, binders, dispersants, and the like, depending on an object of the present disclosure, in addition to the barium titanate ($BaTiO_3$) based dielectric material.

A thickness of the insulating layer 410 is not particularly limited, but may be, for example, 1 μm or less.

Three hundred or more insulating layers 410 may be stacked in order to implement ultrahigh capacity. However, the number of insulating layers 410 is not limited thereto.

The plurality of insulating layers 410 may be in a sintered state, and adjacent insulating layers 410 may be integrated with each other so that boundaries therebetween are not readily apparent without using a SEM.

The first and second internal electrodes 421 and 422 may be alternately stacked with each of the insulating layers 410 interposed therebetween, and may be exposed to opposite end surfaces of the multilayer body 450, respectively.

The first internal electrode 421 exposed to one end surface of the multilayer body 450 may be connected to the first external electrode 431 formed on one end surface of the multilayer body 450, and the second internal electrode 422 exposed to the other end surface of the multilayer body 450 may be connected to the second external electrode 432 formed on the other end surface of the multilayer body 450.

The first and second internal electrodes 421 and 422 may contain, for example, a noble metal material such as palladium (Pd), a palladium-silver (Pd—Ag) alloy, or the like, and a conductive metal such as nickel (Ni), copper (Cu), or the like.

In a cross section of each of the internal electrode patterns 421 and 422 in the width-thickness direction according to another exemplary embodiment in the present disclosure, when a thickness of one side of each of the internal electrode patterns 421 and 422 in relation to a central line c connecting both vertices of each of the internal electrode patterns 421 and 422 in the width direction to each other is $t_1$ and a thickness of the other side of each of the internal electrode patterns 421 and 422 in relation to the central line is $t_2$, in each of the internal electrode patterns 421 and 422 included in the multilayer body 450 of the multilayer electronic component manufactured according to another exemplary embodiment in the present disclosure, $t_2$ may be larger than or equal to $t_1$, and $0.45 \leq t_1/t_2 \leq 1.0$ may be satisfied.

Figure 9:
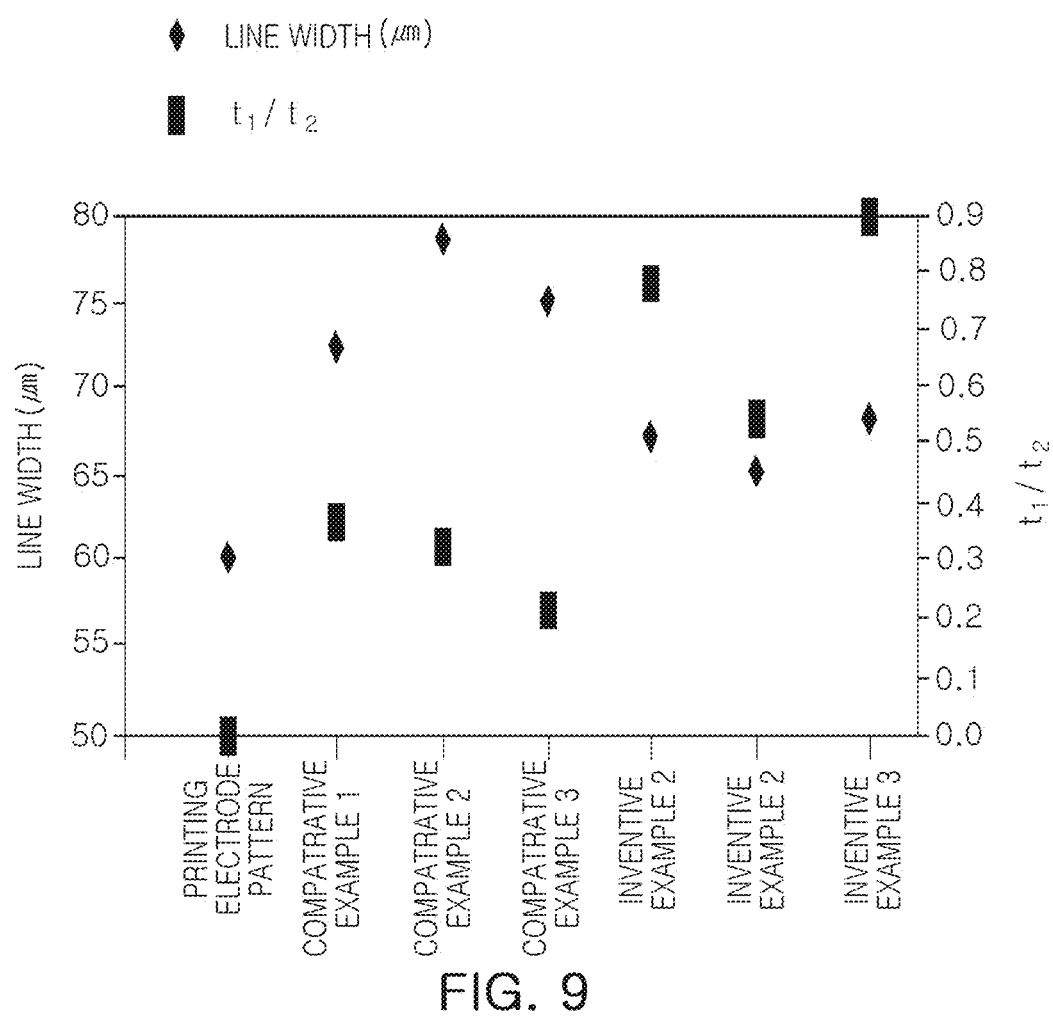
FIG. 9 is a graph illustrating a line width and $t_1/t_2$ ($t_1$ is a thickness of one side of the internal electrode pattern in relation to a central line c and $t_2$ is a thickness of the other side of the internal electrode pattern in relation to the central line c) of the internal electrode pattern depending on a pressing scheme.

FIG. 9 is a graph illustrating a line width and $t_1/t_2$ ($t_1$ is a thickness of one side of the internal electrode pattern in relation to a central line c and $t_2$ is a thickness of the other side of the internal electrode pattern in relation to the central line c) of the internal electrode pattern depending on a pressing scheme.

Line widths and $t_1/t_2$ of the internal electrode pattern 20 after being printed on the first insulating sheet 11 and before being pressed have been illustrated in FIG. 9. In FIG. 9, Comparative Examples 1 to 3 show a case in which a multilayer electronic component is manufactured in a general pre-peeling post-stacking scheme (in which the second insulating sheet 12 is not formed between the upper mold 210 and the uppermost internal electrode pattern 20, such that the upper mold 210 directly presses the internal electrode pattern 20), and Inventive Examples 1 to 3 illustrate a case in which the first insulting sheets having the internal electrode patterns formed thereon are pressed after the second insulating sheet 12 is formed between the upper mold 210 and the uppermost internal electrode pattern 20 according to an exemplary embodiment in the present disclosure.

Referring to FIG. 9, a line width of the internal electrode pattern 20 after being printed on the first insulating sheet 11 and before being pressed was about 60 μm. In Comparative Examples 1 to 3 according to the general pre-peeling post-stacking scheme, a line width of the internal electrode pattern 20 was 70 μm or more, such that a rate of increase of the line width was large. In Inventive Examples 1 to 3 according to an exemplary embodiment in the present disclosure, a line width of the internal electrode pattern 20 was less than 70 μm, such that a rate of increase of the line width was 16% or less.

In addition, in Comparative Examples 1 to 3 according to the general pre-peeling post-stacking scheme, $t_1/t_2$ of the internal electrode pattern 20 was less than 0.4, while in Inventive Examples 1 to 3 according to an exemplary embodiment in the present disclosure, $t_1/t_2$ of the internal electrode pattern 20 was 0.45 or more.

In Inventive Examples 1 to 3, the internal electrode pattern 20 is not directly pressed by the upper mold 210, but may contact the second insulating sheet 12 having fluidity, such that the spreading of the internal electrode pattern 20 is reduced and the internal electrode pattern 20 having a symmetrical structure is formed.

Figure 10A:
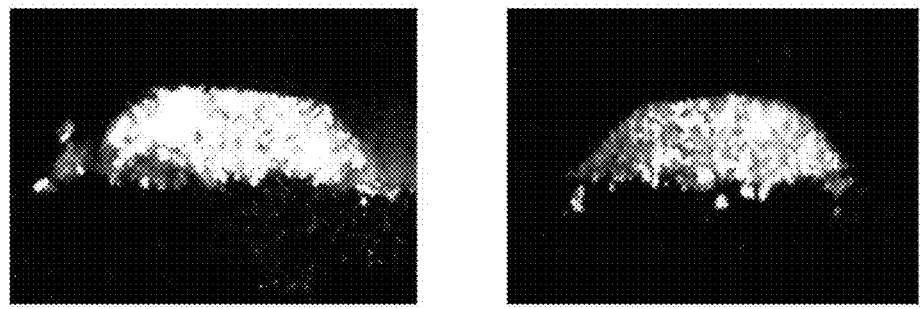
FIG. 10A is a photograph illustrating a cross section of the internal electrode pattern in a width-thickness direction observed using a scanning electron microscope (SEM) before the printed internal electrode pattern is pressed.
Figure 10B:
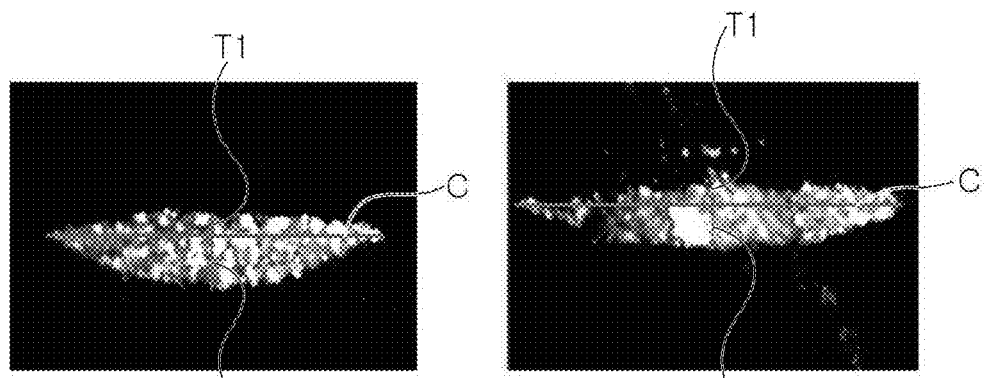
FIG. 10B is a photograph illustrating a cross section of the internal electrode pattern in a width-thickness direction observed using a SEM in a case in which the internal electrode pattern is directly pressed by an upper mold.
Figure 10C:
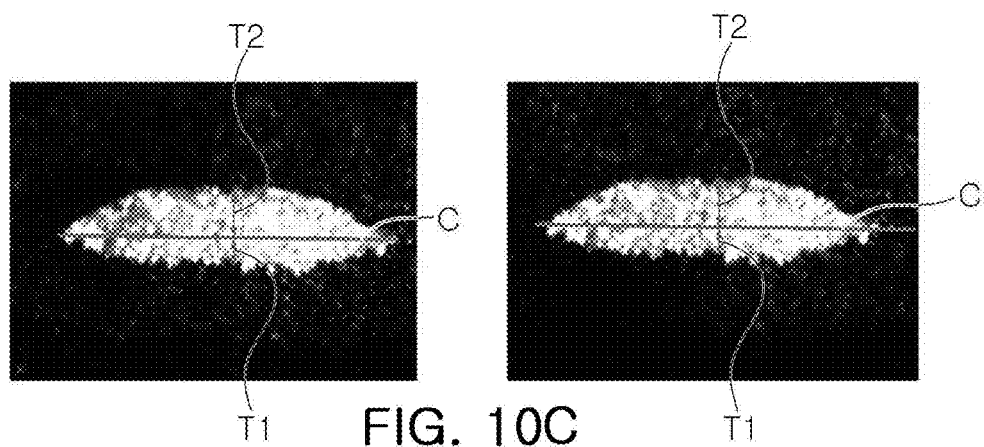
FIG. 10C is a photograph illustrating a cross section of the internal electrode pattern in a width-thickness direction observed using a SEM in a case in which the internal electrode pattern is pressed according to an exemplary embodiment in the present disclosure.

FIG. 10A is a photograph illustrating a cross section of the internal electrode pattern in a width-thickness direction observed using a SEM before the printed internal electrode pattern is pressed. FIG. 10B is a photograph illustrating across section of the internal electrode pattern in a width-thickness direction observed using a SEM when the internal electrode pattern is directly pressed by an upper mold. FIG. 10C is a photograph illustrating a cross section of the internal electrode pattern in a width-thickness direction observed using a SEM when the internal electrode pattern is pressed according to an exemplary embodiment in the present disclosure.

As shown in FIGS. 10A to 10C, an increase in a line width of the internal electrode pattern 20 is less in a case (case of FIG. 10C) in which the first insulating sheets having the internal electrode patterns formed thereon are pressed after the second insulating sheet 12 is formed between the upper mold 210 and the uppermost internal electrode pattern 20 than in a case (case of FIG. 10B) in which the internal electrode pattern 20 is directly pressed by the upper mold 210. As shown in FIGS. 10A to 10C, a difference between the thickness $t_1$ of one side of the internal electrode pattern in relation to the central line c and the thickness $t_2$ of the other side of the internal electrode pattern in relation to the central line c is less in the case of FIG. 10C than in the case of FIG. 10B, and a structure of the internal electrode pattern is more symmetrical in the case of FIG. 10C than in the case of FIG. 10B.

As set forth above, according to exemplary embodiments in the present disclosure, the multilayer electronic component in which the spreading of the internal electrode pattern may be reduced when the laminate is formed by stacking and pressing the insulating sheets having the internal electrode patterns formed thereon and the internal electrode patterns having the symmetrical structure are formed may be manufactured.

While exemplary embodiments have been shown and described above, it will be apparent to those skilled in the art that modifications and variations could be made without departing from the scope of the present invention as defined by the appended claims.

What is claimed is:
1. A multilayer electronic component comprising:
a multilayer body in which a plurality of insulating layers and internal electrode patterns are stacked,
wherein in a cross section in a width-thickness direction of the internal electrode pattern included in the multilayer body, $0.45 \leq t_1/t_2 \leq 1.0$, where $t_1$ is a thickness of one side of the internal electrode pattern in relation to a central line connecting both vertices of the internal electrode pattern in a width direction to each other and $t_2$ is a thickness of the other side of the internal electrode pattern in relation to the central line, and $t_2$ is larger than $t_1$, and
a width of the internal electrode pattern is greater than a thickness of the internal electrode pattern.
2. The multilayer electronic component of claim 1, wherein an internal electrode pattern of the internal electrode patterns overlaps an entirety of an adjacent internal electrode pattern of the internal electrode patterns when viewed in a stacking direction of the internal electrode patterns.

* * * * *